US012127985B2

(12) United States Patent
Abbondanzio et al.

(10) Patent No.: US 12,127,985 B2
(45) Date of Patent: Oct. 29, 2024

(54) LINKAGE FOR CONNECTING MULTIPLE WHEELCHAIRS

(71) Applicant: Dallas/Fort Worth International Airport Board, DFW Airport, TX (US)

(72) Inventors: Matthew L. Abbondanzio, Dallas, TX (US); Piotr Tomasz Marczewski, Dallas, TX (US)

(73) Assignee: Dallas/Fort Worth International Airport Board, DFW Airport, TX (US)

( * ) Notice: Subject to any disclaimer, the term of this patent is extended or adjusted under 35 U.S.C. 154(b) by 574 days.

(21) Appl. No.: 17/390,716

(22) Filed: Jul. 30, 2021

(65) Prior Publication Data

US 2023/0031069 A1 Feb. 2, 2023

Related U.S. Application Data

(60) Provisional application No. 63/226,065, filed on Jul. 27, 2021.

(51) Int. Cl.
*A61G 5/10* (2006.01)
*B62D 59/00* (2006.01)

(52) U.S. Cl.
CPC ............... *A61G 5/10* (2013.01); *B62D 59/00* (2013.01)

(58) Field of Classification Search
CPC .................................. A61G 5/10; B62D 59/00
See application file for complete search history.

(56) References Cited

U.S. PATENT DOCUMENTS

| 5,630,606 A * | 5/1997 | Ryan ................. B60D 1/52 280/479.3 |
| 11,487,290 B2 * | 11/2022 | Nagata ................. B60D 1/04 |
| 2005/0158161 A1 * | 7/2005 | Shubert ................. B60P 3/125 414/563 |
| 2009/0012666 A1 | 1/2009 | Simpson et al. |

(Continued)

FOREIGN PATENT DOCUMENTS

| JP | 2007312805 A | 12/2007 |
| JP | 6300396 B2 | 3/2018 |

OTHER PUBLICATIONS

Notification of Transmittal of the International Search Report and the Written Opinion of the International Searching Authority, or the Declaration dated Oct. 19, 2022 in connection with International Patent Application No. PCT/US2022/037481, 9 pages.

*Primary Examiner* — Minnah L Seoh
*Assistant Examiner* — Marlon A Arce (57) ABSTRACT

A linkage system includes at least one adapter and a connector. Each adapter includes a clamp configured to attach to a frame of a wheelchair. Each adapter includes a pivot angle limiter configured to attach to the clamp. The pivot angle limiter includes a top plate and a bottom plate, each having a central hole through which a pivot shaft is insertable to define a pivot axis for a connector to rotate about. The pivot angle limiter includes first and second barriers, each extending between the top plate and the bottom plate. The first and second barriers define a maximum pivot angle that has a vertex at the pivot axis. The at least one adapter may include a first adapter connected to one end of the connector and to a first wheelchair, and a second adapter connected to an opposite end of the connector and to a second wheelchair.

20 Claims, 12 Drawing Sheets

(56) References Cited

U.S. PATENT DOCUMENTS

2012/0159768 A1* 6/2012 Johnson .................... F16B 2/10
                                                        403/187
2015/0360708 A1* 12/2015 Benton ................. B62B 5/0033
                                                        180/14.1

* cited by examiner

LINKAGE FOR CONNECTING MULTIPLE WHEELCHAIRS

CROSS-REFERENCE TO RELATED APPLICATIONS

The present application claims priority to U.S. Provisional Patent Application No. 63/226,065, filed on Jul. 27, 2021. The content of the above-identified patent document is incorporated herein by reference.

TECHNICAL FIELD

This disclosure generally relates to mechanical linkages. More specifically, this disclosure relates to a linkage for connecting multiple wheelchairs.

BACKGROUND

At an airport, a travel assistant may be tasked with transporting multiple passengers, who are seated in their respective wheelchairs, from one airport gate or terminal to another airport gate. One travel assistant pushes or pulls a first wheelchair. In some instances, one hand of the travel assistant pushes or pulls one wheelchair, and at the same time, the other hand of the travel assistant pushes or pulls a second wheelchair side-by-side to the first wheelchair. Side-by-side transportation of two wheelchairs contributes to bottle-neck traffic jams in the limited width of airport terminal corridors, which traffic jams frustratingly slow down the pace of passengers trying to pass alongside the two side-by-side wheelchairs.

SUMMARY

This disclosure provides a linkage for connecting multiple wheelchairs.

In a first embodiment, an apparatus includes an adapter, which includes a clamp and a pivot angle limiter. The clamp is configured to attach to a frame of a wheelchair. The pivot angle limiter is configured to attach to the clamp. The pivot angle limiter includes a top plate and a bottom plate, each having a central hole through which a pivot shaft is insertable to define a pivot axis for a connector to rotate about. The pivot angle limiter includes first and second barriers, each extending between the top plate and the bottom plate. The first and second barriers define a maximum pivot angle that has a vertex at the pivot axis.

In a second embodiment, a linkage system includes at least one adapter and a connector. Each adapter includes a clamp configured to attach to a frame of a wheelchair. Each adapter includes a pivot angle limiter configured to attach to the clamp. The pivot angle limiter includes a top plate and a bottom plate, each having a central hole through which a pivot shaft is insertable to define a pivot axis for a connector to rotate about. The pivot angle limiter includes first and second barriers, each extending between the top plate and the bottom plate. The first and second barriers define a maximum pivot angle that has a vertex at the pivot axis.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

FIGS. 1 through 12, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

This disclosure provides a unique wheelchair system that links multiple wheelchairs together in a "train," which enables a person (e.g., travel assistant) to push or pull more than one wheelchair at a time. For example, at an airport, a travel assistant may be tasked with transporting multiple passengers, who are seated in their respective wheelchairs, from one airport gate or terminal to another airport gate. The wheelchair system of this disclosure enables the travel assistant to push or pull a first wheelchair with one passenger and to link and tow one or more linked wheelchairs with passengers. In some embodiments, the wheelchair system utilizes a motorized puller placed at the front of the first wheelchair, which will increase staff leveragability. A single travel assistant assisted by the motorized puller is able to transport the weight of more passengers in wheelchairs linked by the system of this disclosure compared to the weight that the travel assistant can transport without assistance from the motorized puller. For example, multiple linkage systems according to embodiments of this disclosure can be used to link more than two wheelchairs (e.g., 3-5 wheelchairs) into a single train that is pushed or pulled by the single travel assistant, who may or may not be assisted by the motorized puller.

Figure 1A:
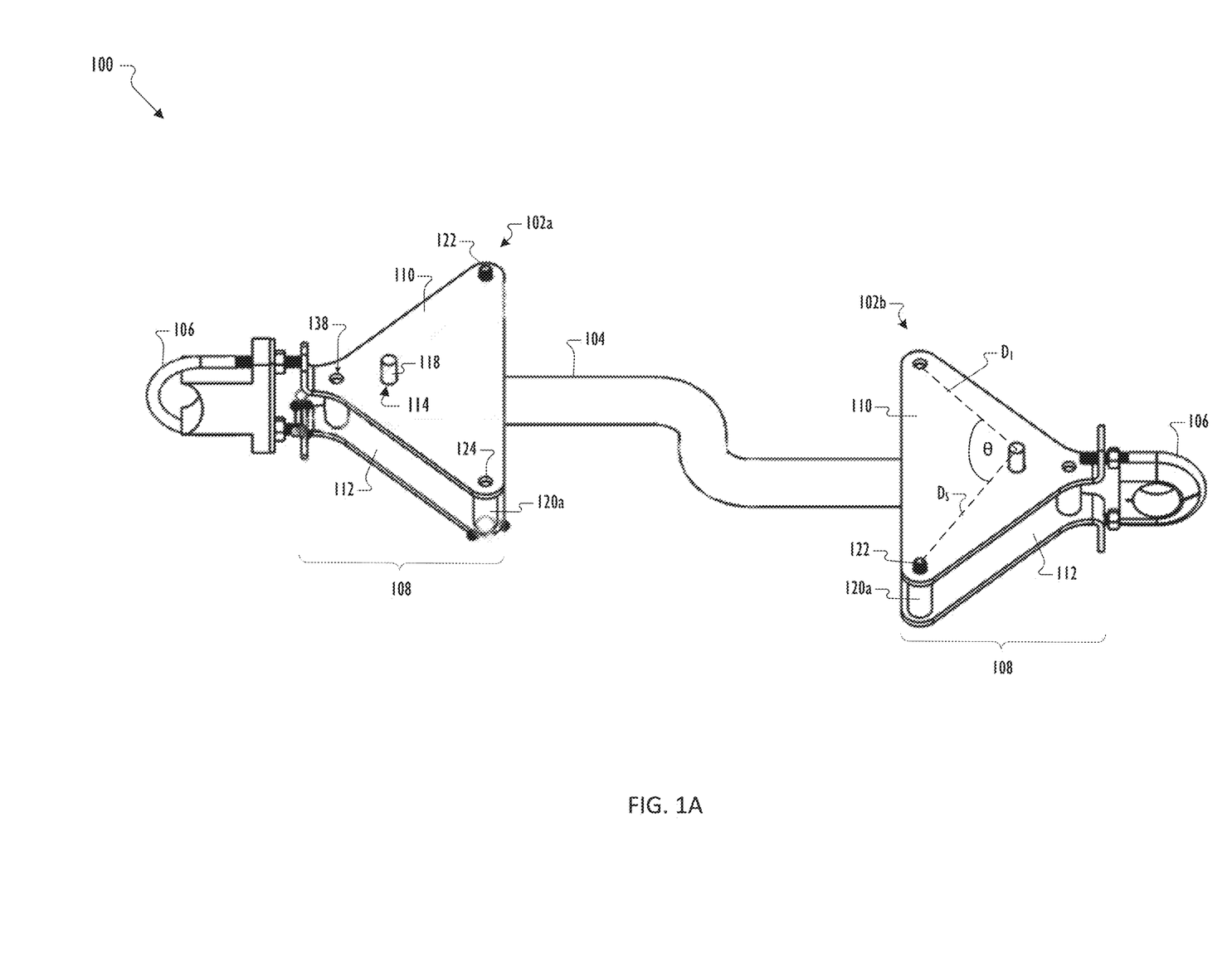
FIGS. 1A and 1B (FIG. 1) illustrate an example linkage system for connecting multiple wheelchairs according to this disclosure.
Figure 1B:
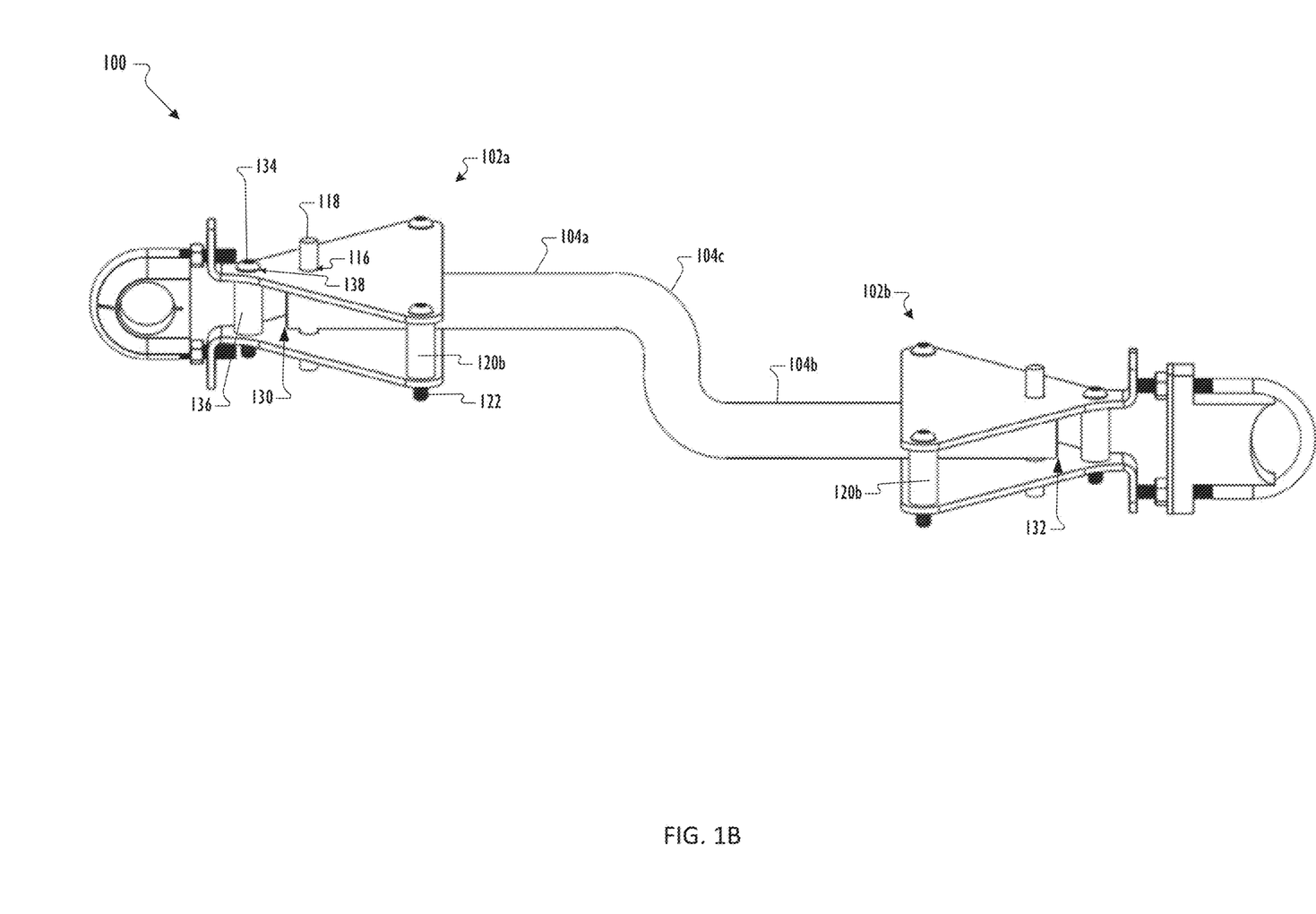

FIG. 1 (FIGS. 1A and 1B) illustrates an example linkage system 100 for connecting multiple wheelchairs according to this disclosure.

As described in more detail below, the linkage system 100 includes at least one adapter 102, and a connector 104. The at least one adapter 102 includes a first adapter 102a that attaches to a first wheelchair and a second adapter 102b that attaches to a second wheelchair. The connector 104 connects to the first and second adapters 102a-102b at opposite ends of the connector 104. When the linkage system 100 links (e.g., tethers) a first wheelchair to a second wheelchair, a travel assistant is able to push or pull the first wheelchair and to tow the second wheelchair in similar manner as a "train." For ease of explanation, the first wheelchair is also referred to as a "leading wheelchair," and the second wheelchair is also referred to as a "trailing wheelchair." Example implementations of the adapter 102 are described in more detail below.

The adapter 102 includes a clamp 106 configured to attach to a frame of a wheelchair. In some embodiments of the linkage system 100, each of the at least one adapter 102 is identical, but in other embodiments, the first adapter 102a may be modified compared to the second adapter 102b. For example, the clamp 106 of the first adapter 102a may be identical to or different from the clamp of the second adapter 102b.

The adapter 102 includes a pivot angle limiter 108 configured to attach to the clamp 106. The pivot angle limiter 108 includes a top plate 110 and a bottom plate 112, each having a central hole 114 (FIG. 1A) and 116 (FIG. 1B) through which a pivot shaft 118 is insertable to define a pivot axis about which the connector 104 rotates.

The adapter 102 includes a first barrier 120a (FIG. 1A) and second barrier 120b (FIG. 1B), each extending vertically between the top plate 110 and the bottom plate 112. The first and second barriers 120a-120b define a maximum pivot angle θ that has a vertex at the pivot axis. In some embodiments, the distance between the positions of the first and second barriers 120a-120b is fixed, and the location of the pivot shaft 118 is fixed. The distance from the pivot shaft 118 to the first barrier 120a is one distance, $D_1$. The distance from the pivot shaft 118 to the second barrier 120b can be referred to as $D_S$, which, in some embodiments, can be the same as the distance $D_1$. In some embodiments, a maximum pivot angle θ is ninety degrees (90°), such as when the first and second barriers 120a-120b are equidistant from the pivot shaft 118. The first and second barriers 120a-120b are composed of a rigid material to maintain the distance between the top plate and the bottom plate.

In some embodiments, the first and second barriers 120a-120b include a post spacer that extends a distance from the top plate 110 to the bottom plate 112. The post spacer is removably coupled to the top plate 110 and the bottom plate 112. The post spacer is hollow and includes a spacer hole extending longitudinally through the post spacer from one end to the opposite end. The spacer hole is configured to receive a mechanical fastener 122 that extends longitudinally through the hollow center of the post spacer. Each of the top plate 110 and the bottom plate 112 includes a corresponding spacer hole into which the mechanical fastener 122 insertably fits to maintain the post spacer centered about the corresponding spacer holes of the top and bottom plates 110 and 112. More particularly, the top plate 110 includes a spacer hole 124 corresponding to the spacer hole 126 (shown in FIG. 2) through the bottom plate 112.

In some embodiments, the adapter 102 includes the pivot shaft 118, which is configured to insert through the central hole 114 of the top plate 110, the central hole 116 of the bottom plate 112, and a connector hole through a top side and a bottom side of the connector 104.

The linkage system 100 provides safety features. For example, the top plate 110 prevents a body part of a human passenger from falling down to a location between the connector 104 and either of the barriers 120a or 120b, which is a location where the body part can be pinched when the connector 104 pivots toward the barrier. In an analogous way, the bottom plate 112 performs an anti-pinching function that prevents objects (e.g., body parts, clothing, luggage straps, toys, etc.) located beneath the linkage system 100 from rising up to a location between the connector 104 and either of the barriers 120a or 120b. These anti-pinching functions not only protect objects, but also prevent inadvertent reduction of the maximum pivot angle, which occurs when an object prevents the connector 104 reaching a position of the first maximum or a position of the second maximum, which are positions where the connector 1004 is in surface-to-surface contact with the first barrier 120a or the second barrier 120b, respectively. An inadvertent reduction of the maximum pivot angle changes the turning radius of the train of wheelchairs, which can prevent the travel assistant from making a particular turn along a path that the transport assistant desires the train of wheelchairs to follow.

Referring to FIG. 1B, the connector 104 includes a first straight pipe 104a configured to connect to the first adapter 102a at a first end 130 of the connector 104. The connector 104 includes a second straight pipe 104b configured to connect to the second adapter 102b at a second end 132 of the connector 104, opposite to the first end 130 of the connector 104. The connector 104 includes a coupler 104c configured to connect to the first straight pipe 104a at one vertical level and to the second straight pipe 104b at a different vertical level. In order to account for height differences from one wheelchair to another, the coupler 104c is a straight pipe in some embodiments, or is a bent pipe in other embodiments. The connector 104 is not limited to having three discrete components 104a-104c. It is understood that the connector 104 can include a unitary shaft that has the shape of the connected first and second straight pipes 104a-104b and coupler 104c. For example, when the connector 104 is as a unitary shaft, the connector connects to first adapter 102a at one end of the unitary shaft at one vertical level, includes one or more bends, and connects to the second adapter 102b at the opposite end of the unitary shaft at a different vertical level. As shown, the connector 104 includes at least two bends. The connector 104 can be shaft that is solid or hollow.

The adapter 102 includes a post spacer 136 composed of a rigid material to maintain a distance between the top plate and the bottom plate, the distance being at least the diameter of the connector 104 plus a tolerance that allows the connector 104 to pivot without rubbing against the inner surfaces of the top and bottom plates 110 and 112. In this embodiment, the post spacer 136 is identical to the barriers 120a-120b. However, it is understood that the post spacer 136 can have any suitable shape, dimensions, and capability to be unremovable or removably coupled to the top and bottom plates 110 and 112. The position of the post spacer 136, relative to the top and bottom plates 110 and 112, is fixed when a shaft 134 is inserted through both the hollow center of the post spacer 136 and corresponding holes 138 of the top and bottom plates 110 and 112. In this embodiment, the shaft 134 is identical to the mechanical fastener 122 and performs a similar function of locking the post spacer 136 to the top and bottom plates 110 and 112. In other embodiments, the shaft 134 is identical to the pivot shaft 118 and may be referred to as a second pivot shaft 134.

Although FIG. 1 illustrates one example of a linkage system 100, various changes may be made to FIG. 1. For example, various components in FIG. 1 may be combined, further subdivided, replicated, omitted, or rearranged and additional components may be added according to particular needs. For example, the linkage system 1000 illustrated in FIGS. 10, 11, and 12 includes adapters 1002a-1002b with a sidewall integrated with the top plate and bottom plate. As another example, the pivot angle limiter 108 or the adapter 102 may be integrated with the frame of a wheelchair instead of being a modular component that removably attaches to the frame of any wheelchair. Also, FIG. 1 illustrates one example type of adapter 102. However, this functionality may be used in any other suitable device or system. For example, the adapter 102 can be attached to a stroller, a wagon, or other mobility equipment for utilizing the linkage system 100 with a variety of suitable devices.

Figure 2:
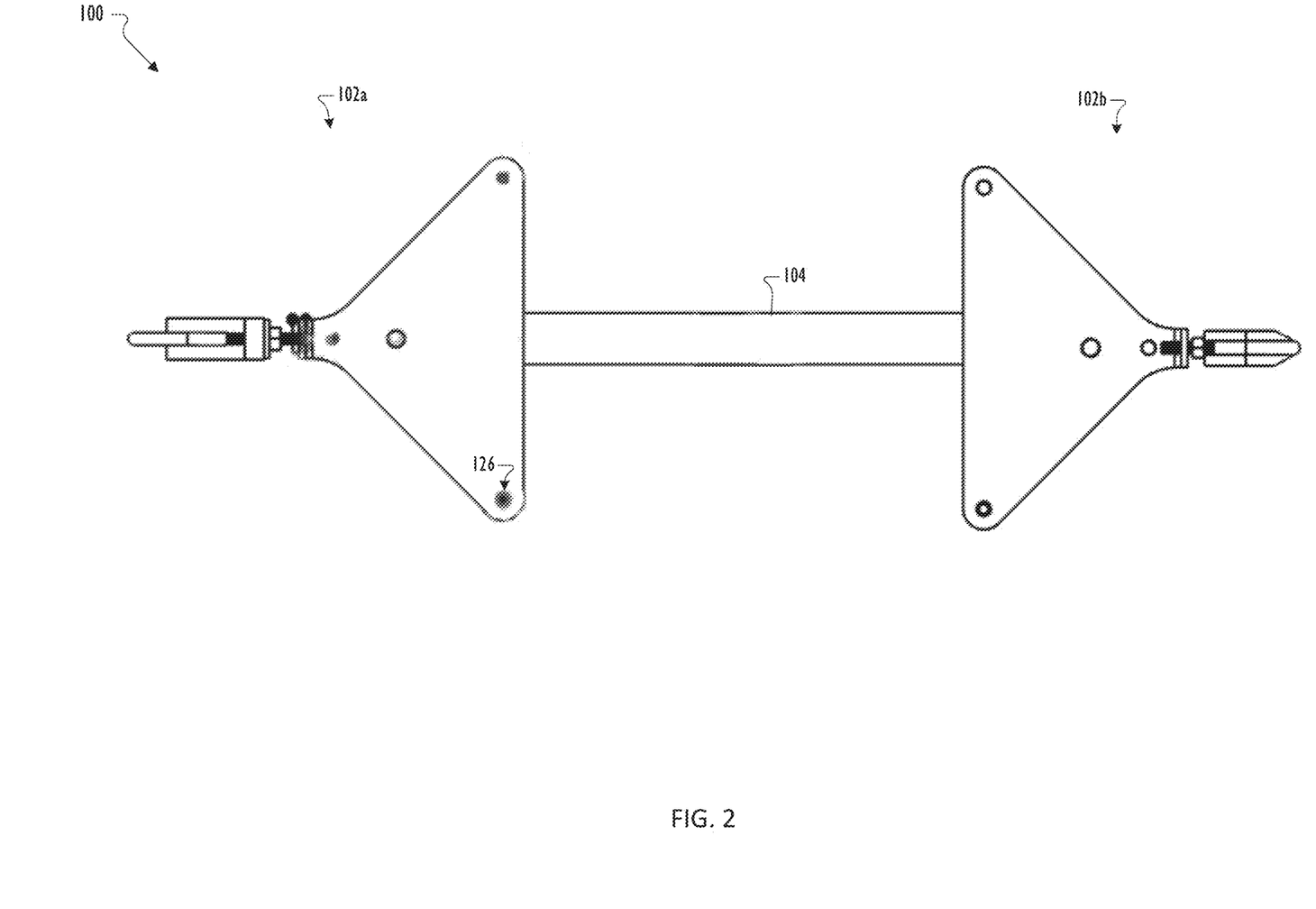
FIG. 2 illustrates a bottom view of the linkage system of FIG. 1.

FIG. 2 illustrates a bottom view of the linkage system of FIG. 1. As introduced above, the spacer hole 124 shown in FIG. 1A corresponds to the spacer hole 126 shown in FIG. 2.

Figure 3:
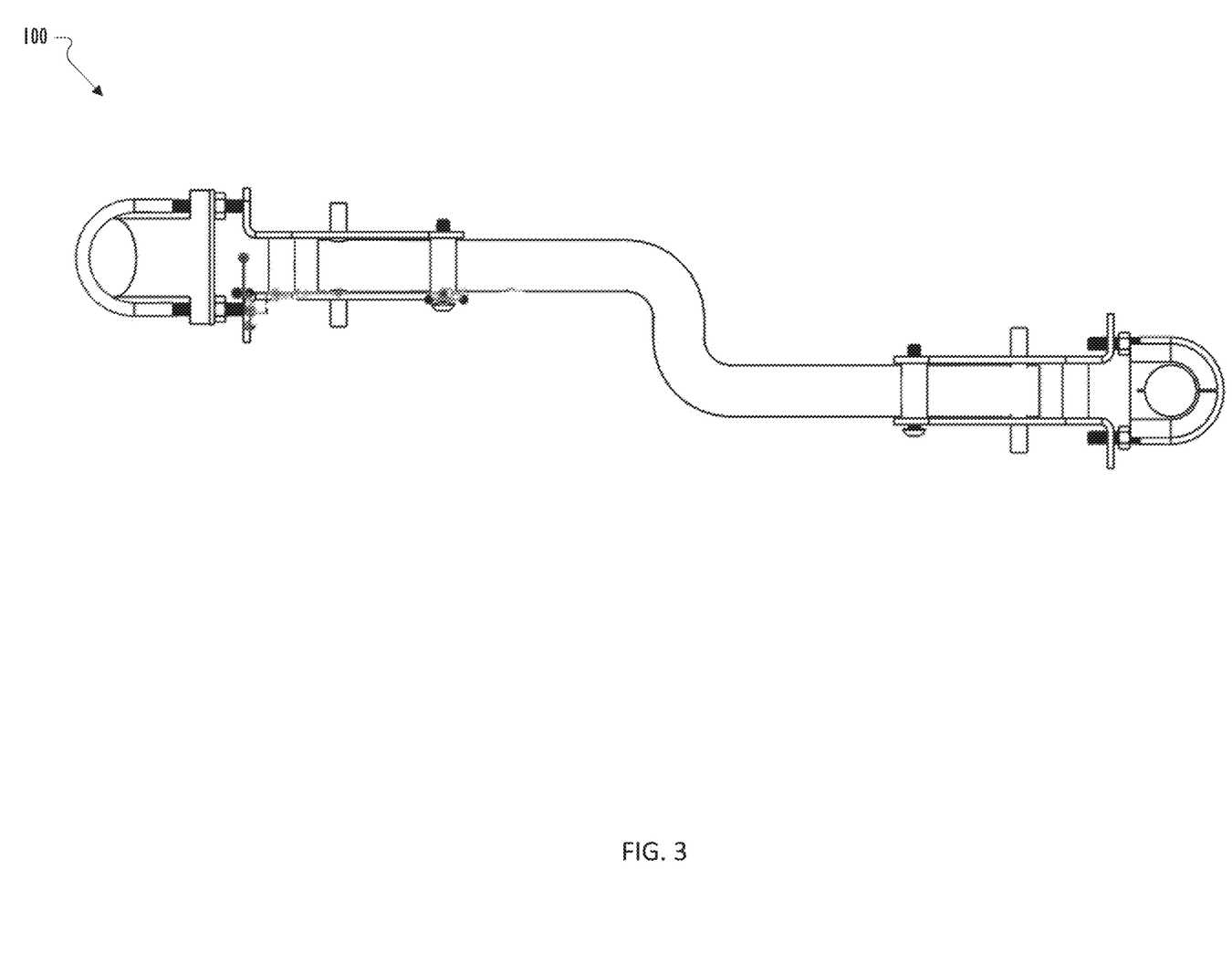
FIG. 3 illustrates a side view of the linkage system of FIG. 1.

FIG. 3 illustrates a side view of the linkage system of FIG. 1.

Figure 4:
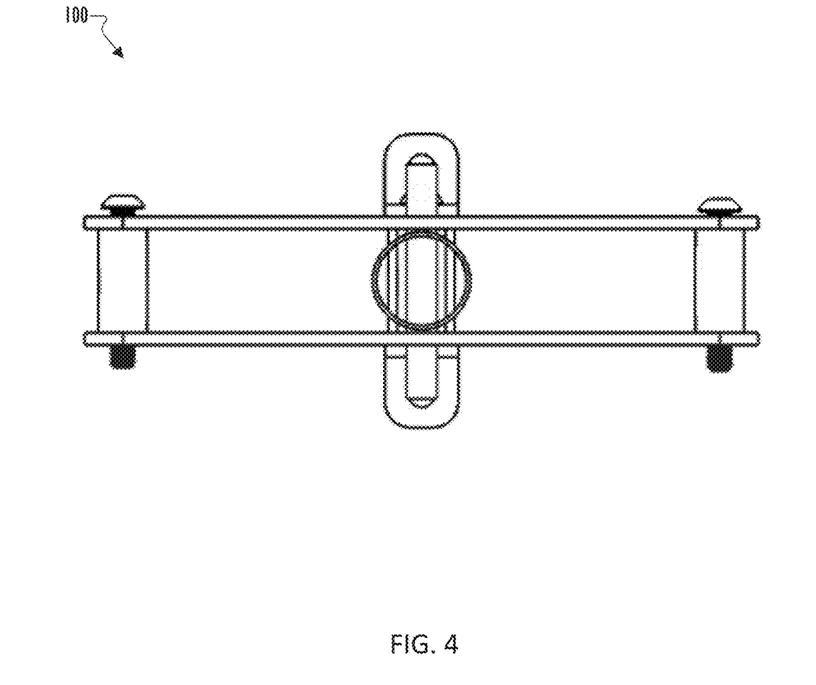
FIG. 4 illustrates a front view of the linkage system of FIG. 1.

FIG. 4 illustrates a front view of the linkage system of FIG. 1.

Figure 5:
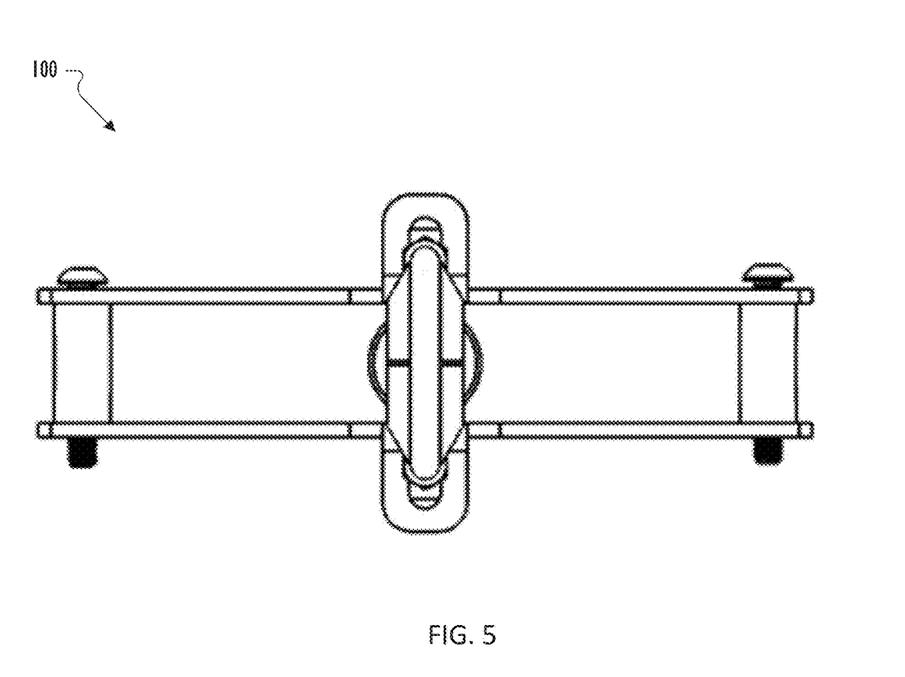
FIG. 5 illustrates a rear view of the linkage system of FIG. 1.

FIG. 5 illustrates a rear view of the linkage system of FIG. 1.

Figure 6A:
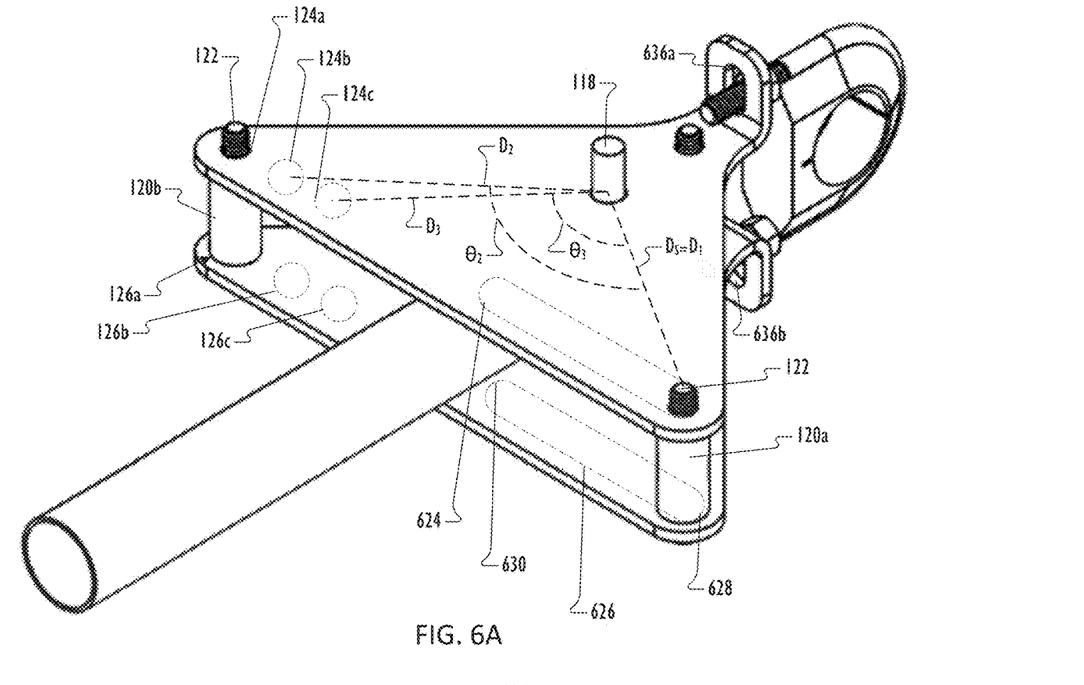
FIG. 6A illustrates an orthogonal view of the front, top, and the right sides of an adapter that attaches to a footrest of a trailing wheelchair, according to this disclosure.

FIG. 6A illustrates an orthogonal view of the front, top, and the right sides of an adapter that attaches to a footrest of a trailing wheelchair, according to this disclosure.

In some embodiments, the location of the pivot shaft 118 is fixed, but the maximum pivot angle θ is adjustable by varying the separation distance (shown in FIG. 6B as $S_1$, $S_2$, $S_3$, or $S_4$) between the first and second barriers 120a-120b. As introduced above, in some embodiments, the top plate 110 and the bottom plate 112 include corresponding spacer holes 124 and 126 through which the mechanical fastener 122 insertably fits. The corresponding spacer holes 124 and 126 can include multiple pairs of corresponding spacer holes. For example, one pair includes first spacer holes 124a and 126a positioned one distance $D_1$ (as shown in FIG. 1A) from the pivot shaft 118 and defines the maximum pivot angle θ as a first angle; and another pair includes other spacer holes 124b and 126b or 124c and 126c positioned a different distance $D_2$ or $D_3$ from the pivot shaft 118 and defines the maximum pivot angle or as a second angle θ2 or third angle $θ_3$, respectively. The first maximum pivot angle θ is different from the second angle θ2 and the third angle $θ_3$, which are different from each other.

Figure 6B:
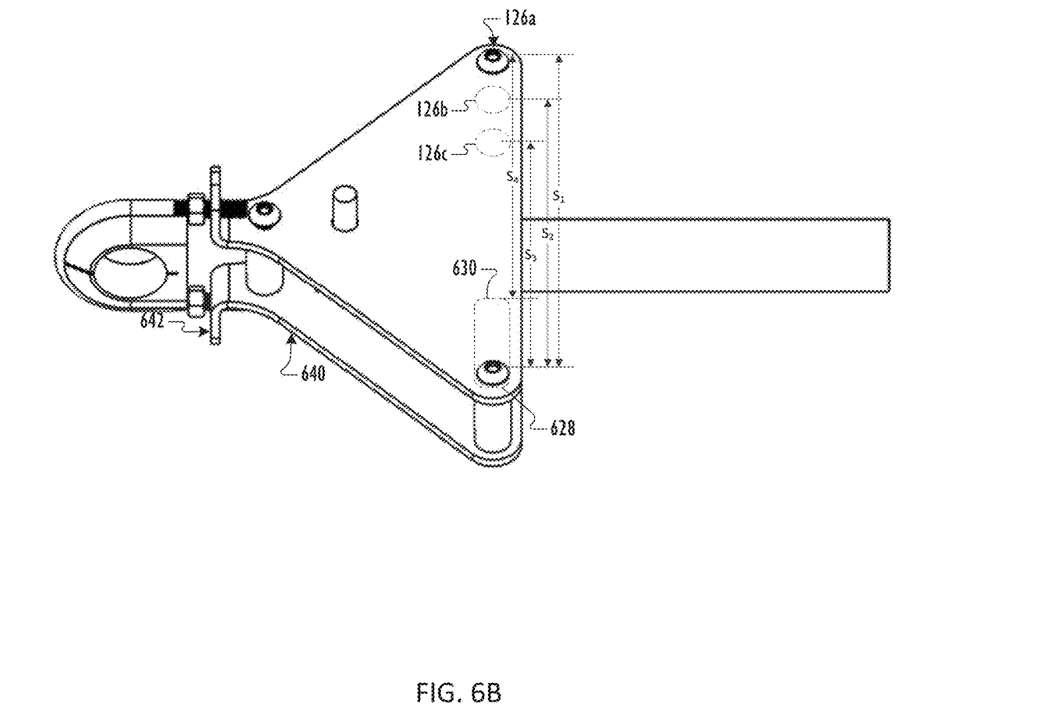
FIG. 6B illustrates an orthogonal view of the rear, bottom, and left sides of the adapter of FIG. 6A.

In some embodiments, each of the top plate 110 and the bottom plate 112 includes a spacer slot 624 and 626 into which the mechanical fastener 122 is insertable and slidable between a first end 628 of the slot and a second end 630 of the slot.

As introduced above, the maximum pivot angle θ, $θ_2$, or $θ_3$ is adjustable based on the separation distance (shown in FIG. 6B as $S_1$, $S_2$, $S_3$, or $S_4$) between the first and second barriers 120a-120b, which separation is based on a location where the mechanical fastener 122 affixes the barrier 120 (i.e., the post spacer) to the top and bottom plates 110 and 112. For example, the first barrier 120a is affixed at a location between the first and second ends 628 and 630 of the spacer slot 624, 626. When the mechanical fastener 122 affixes the first barrier 120a at the first end 628, a first separation distance $S_1$ spans from the mechanical fastener 122 (within first barrier 120a) to the spacer hole 124a, and a distance between the pivot shaft 118 and the mechanical fastener 122 can be one distance $D_1$. When the first barrier 120a moves to the second end 630, a fourth separation distance $S_4$ spans from the mechanical fastener 122 (within first barrier 120a) to the spacer hole 124a, and a distance between the pivot shaft 118 and the mechanical fastener 122 can be a different distance than the distance $D_1$, reducing the maximum pivot angle to be smaller than the first angle.

Each of the top plate 110 and bottom plate 112 includes a respective clamping hole 636a and 636b through which the clamp 106 passes for physically attaching to the plates. The shape of the clamping hole 636a, 636b is oblong in some embodiments, which enables the clamp 106 to pass through the clamping hole 636a, 636b at different distances of separation.

FIG. 6B illustrates an orthogonal view of the rear, bottom, and left sides of the adapter of FIG. 6A.

In some embodiments of the pivot angle limiter 108, the top plate 110 and bottom plate 112 are identical and are arranged in a mirror image manor. The top plate 110 includes a horizontal planar portion 640 and a flange 642 that is bent vertically. The flange 642 can be orthogonal to the horizontal portion 640, but this top plate 110 is not limited to having orthogonal portions.

Figure 6C:
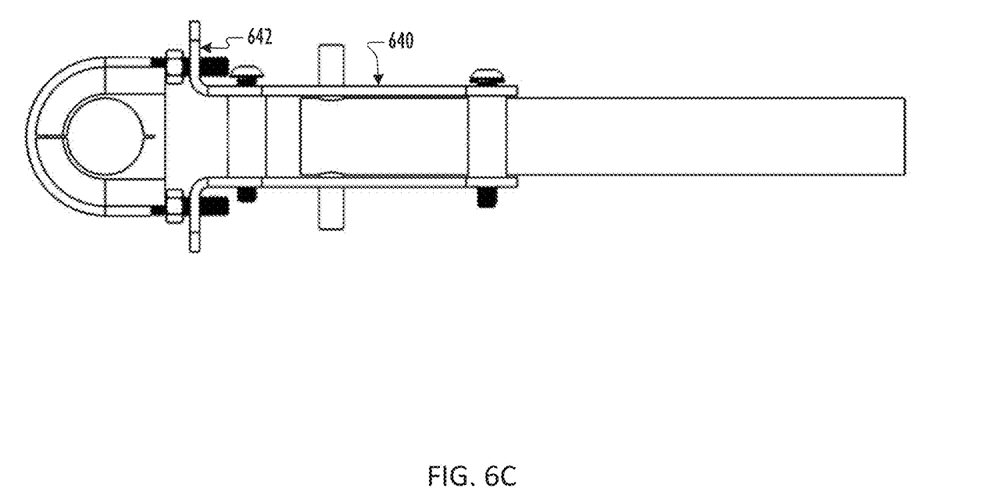
FIG. 6C illustrates a side view of the adapter of FIG. 6A.

FIG. 6C illustrates a side view of the adapter of FIG. 6A.

Figure 6D:
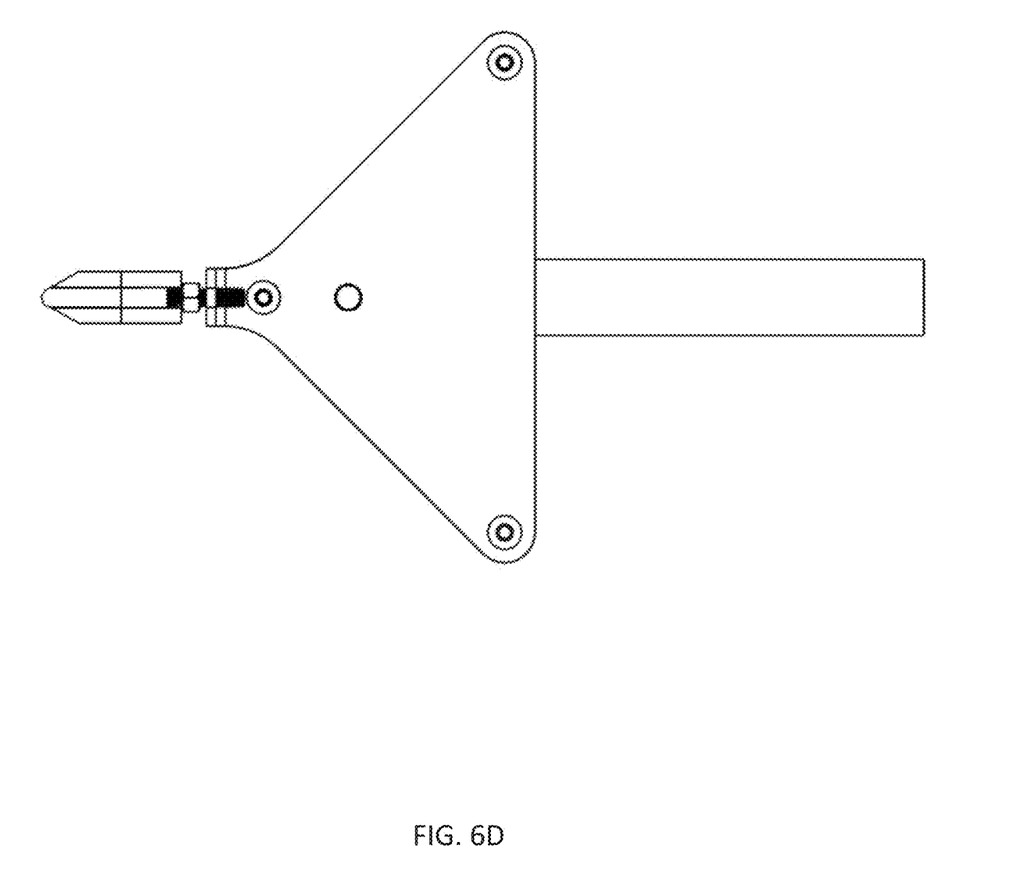
FIG. 6D illustrates a bottom view of the adapter of FIG. 6A.

FIG. 6D illustrates a bottom view of the adapter of FIG. 6A.

Figure 7:
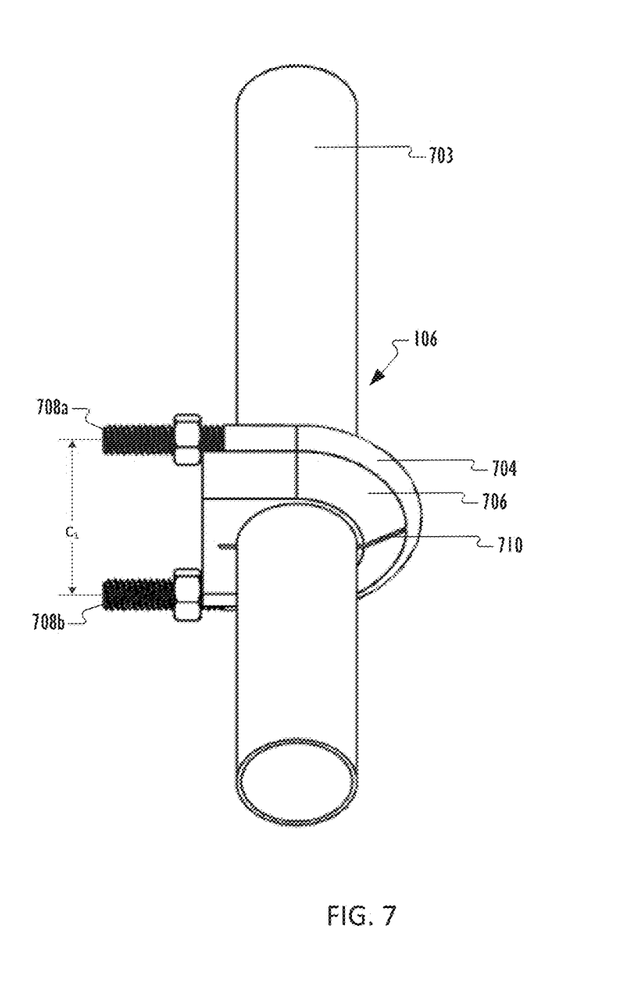
FIG. 7 illustrates a clamp of the adapter of FIG. 6A clamped to a footrest of a wheelchair.

FIG. 7 illustrates a clamp 106 of the second adapter 102b of FIG. 6A clamped to a frame member 703 of a trailing wheelchair. The clamp 106 of the second adapter 102b is configured to clamp to a frame member 703 of a second wheelchair.

The clamp 106 includes a U-bolt 704, and a spacer that is configured to clamp the U-bolt 704 to one of: an oval cross-sectioned member (e.g., undercarriage frame member) of the frame of the wheelchair, or a circular cross-sectioned member (e.g., footrest) of the frame of the wheelchair.

In some embodiments, the spacer included as part of the clamp 106 includes a vibration dampener 706 that absorbs vibrations when the wheelchair moves relative to the clamp 106 of the linkage system 100. The vibration dampener 706 can include a hole having a cross-section that is the same shape and size as the cross-section of the frame member 703 of the wheelchair member. For example, the cross-section of the frame member 703 can be circular or any other suitable shape. The frame member 703 can be inserted laterally into the hole of vibration dampener 706 through a slit 710 from an outer perimeter the vibration dampener 706 to the perimeter of the hole. Also, the frame member 703 can be inserted longitudinally into the hole of vibration dampener 706.

The U-bolt 704 includes two threaded ends 708a and 708b, each of which passes through a respective one of the clamping holes 636a and 636b of the top plate 110 and bottom plate 112. When the clamping hole 636a, 636b is oblong, different sized U-bolts can be attached to the top plate 110 and bottom plate 112, interchangeably. For example, if the frame member 703 has a 1-inch diameter, then the two ends 708a and 708b of one U-bolt 704 can pass through the clamping holes 636a 636b with a distance $C_1$ of separation. Similarly, if a different frame has a different diameter, then the two ends of a different sized U-bolt can pass through the clamping holes 636a and 636b with different distance of separation other than $C_1$.

Figure 8:
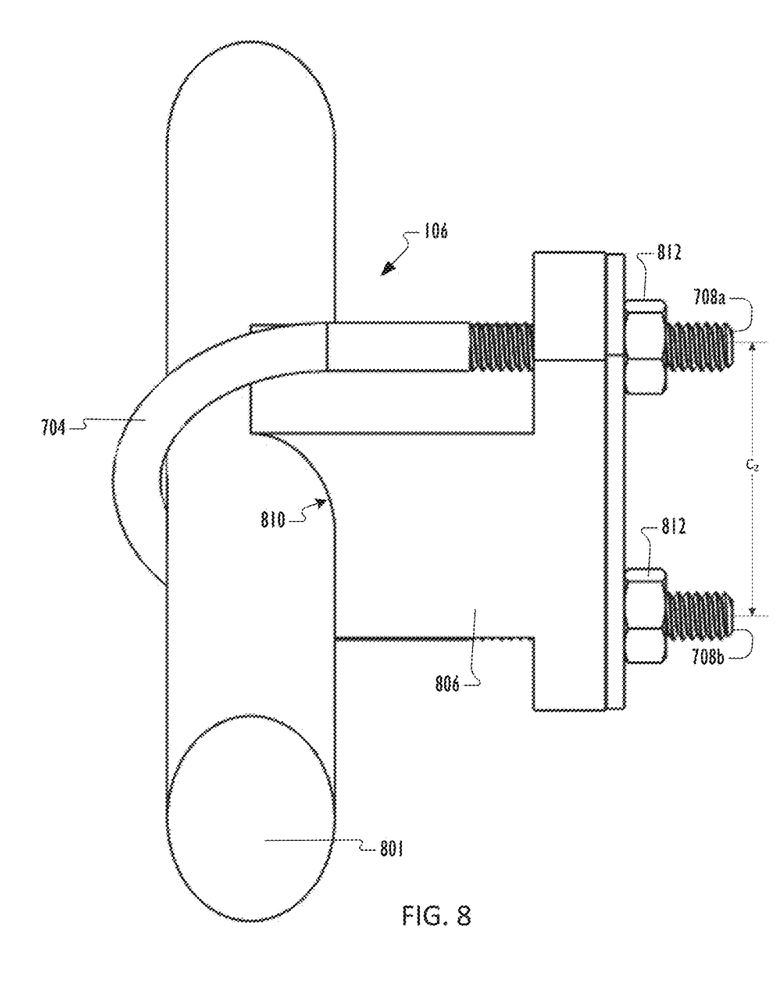
FIG. 8 illustrates a clamp of an adapter attached to a frame of a leading wheelchair according to this disclosure.

FIG. 8 illustrates a clamp 106 of a first adapter 102a attached to a frame 801 of a leading wheelchair according to this disclosure. The clamp 106 of the first adapter 102a is configured to clamp to the frame 801 of a leading wheelchair.

In some embodiments, the clamp 106 includes a custom spacer 806 that reduces vibrations when the wheelchair moves relative to the clamp 106 of the linkage system 100. In some embodiments, the custom spacer 806 has a T-shape with a concave bottom in which the recess 810 has a cross-section that matches the same shape and size as the cross-section of the frame 801 of the wheelchair member. For example, the cross-section of the frame member 801 can be oval or rectangular. The inner curved shaft portion of the U-bolt 704 and the recess 810 apply pressure to opposite sides of the frame 801, in order keep the first adapter 102a attached to the frame 801 of the wheelchair.

In some embodiments, the custom spacer 806 has a T-shape in which the cross members have bolt holes 902 (shown in FIG. 9) through which ends 708a and 708b of the U-bolt 704 pass. Once the ends 708a and 708b of the U-bolt 704 pass through the bolt holes of the custom spacer 806 and through the clamping holes 636a and 636b of the top and bottom plates 110 and 112, nuts 812 can be installed onto the ends 708a and 708b, thereby locking the clamp 106 to both the frame 801 and the pivot angle limiter 108.

Figure 9:
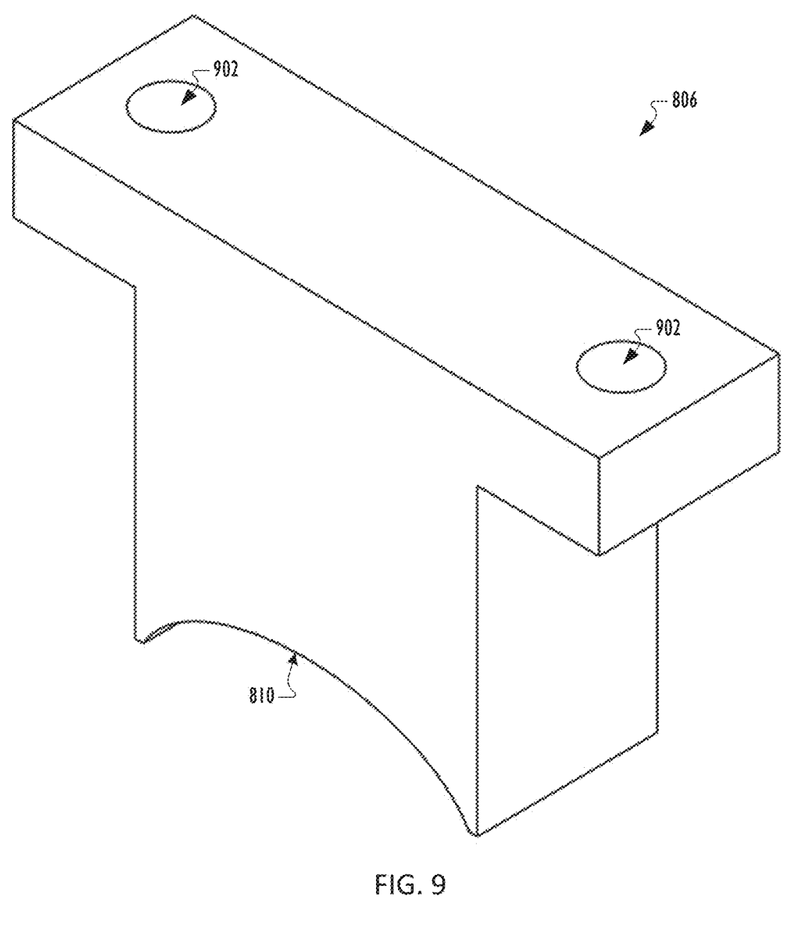
FIG. 9 illustrates a spacer of the clamp of FIG. 8.

FIG. 9 illustrates the custom spacer 806 of the clamp of the clamp of FIG. 8.

Figure 10:
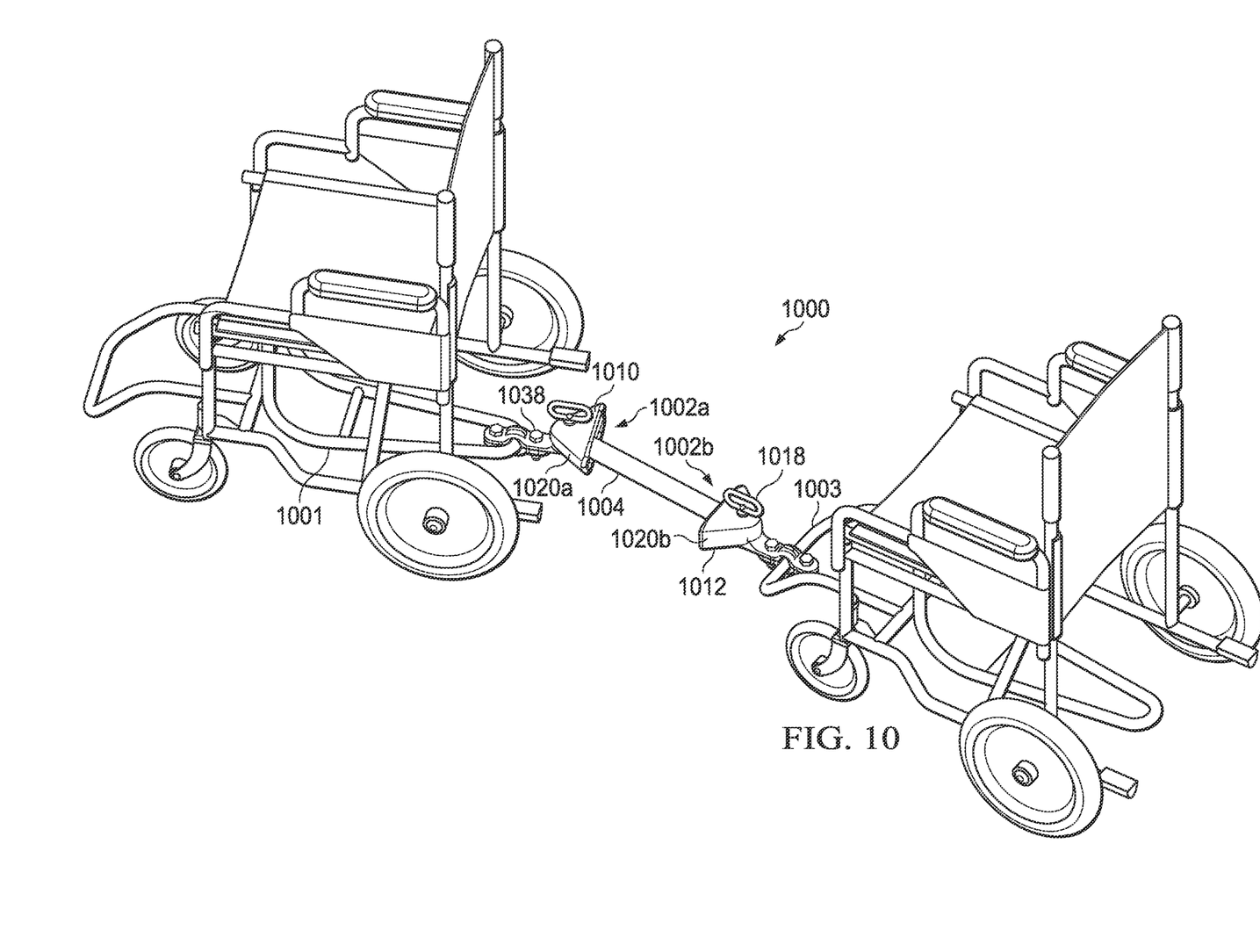
FIG. 10 illustrates a second example linkage system connected to multiple wheelchairs according to this disclosure.

FIG. 10 illustrates a second example linkage system 1000 connected to multiple wheelchairs according to this disclosure. Some components of the linkage system 1000 of FIG. 10 may, for example, be used in the linkage system 100 of FIG. 1 for tethering a first wheelchair to a second wheelchair by attaching a first linkage adapter 1002a to an undercarriage frame 1001 of the first wheelchair, attaching a second linkage adapter 1002b to a footrest 1003 of the second wheelchair, and attaching a connector 1004 to the first and second linkage adapters 1002a-1002b at opposite ends of the connector 1004. For example, the connector 1004 of FIG. 10 includes a straight pipe, which could be interchangeable with the multi-level connector 104 of FIG. 1. As another example, a pivot shaft 1018 (which includes a loop-shaped top handle) and a bolt 1038 could be interchangeable with the pivot shaft 118 and shaft 134 of FIG. 1B.

Note, however, that the linkage system 100 of FIG. 1 and the linkage system 1000 of FIG. 10 may be used with any other suitable device and in any other suitable system.

As shown, in some embodiments, at least one of the first and second barriers 1020a-1020b forms a side wall integrated with the top plate 1010 and the bottom plate 1012.

Although FIG. 10 illustrates one example of a linkage system 1000, various changes may be made to FIG. 10. For example, various components in FIG. 10 may be combined, further subdivided, replicated, omitted, or rearranged and additional components may be added according to particular needs. As a particular example, the linkage system 1000 can be manufactured using additive manufacturing such that the adapter 1002 is a unitary body, for example, a unitary body in which the first and second barriers are integrated with the top and bottom plates of the adapter 1002. The linkage system 1000 can be manufactured using another manufacturing technique, such as machining, wherein at least one of the top and bottom plates of the adapter 1002 is affixed (e.g., welded, adhered, machined, or fitted) to the first barrier, the second barrier, or both barriers. It is understood that the linkage systems 100 and 1000 of this disclosure are not limited to have first and second barriers being either removably coupled post spacers (as shown in FIG. 1) or affixed side walls, but can also include affixed post spacers, or removably coupled side walls. As another particular example, the barrier 1020a or 1020b could be a flange to top plate 1010 that extends partially toward the bottom plate 1012, or in reverse, a flange to bottom plate 1012 that extends partially toward the top plate 1010.

Figure 11:
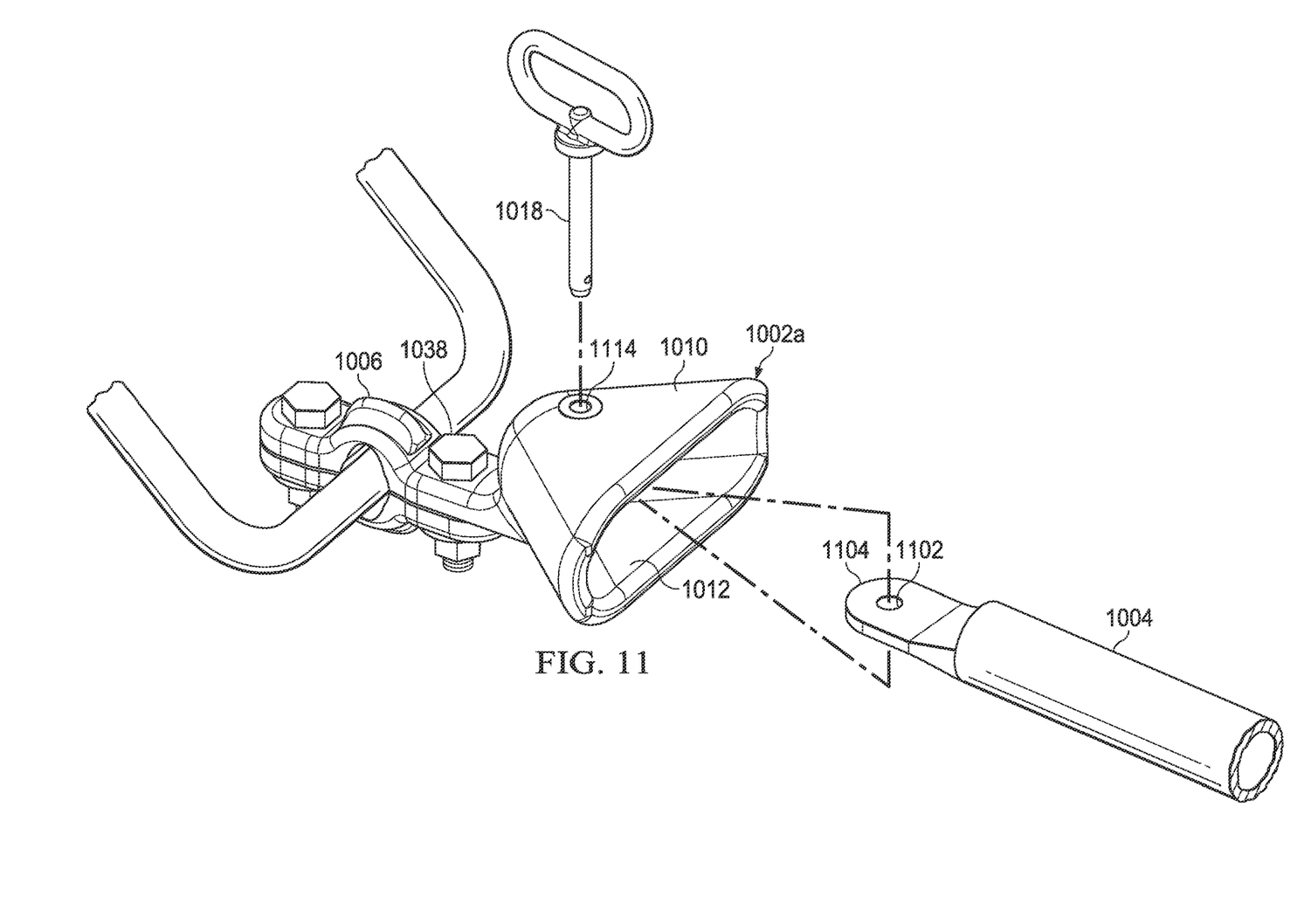
FIG. 11 illustrates the connector, pivot shaft, and first adapter of FIG. 10 detached from each other, according to this disclosure.

FIG. 11 illustrates the connector 1004, pivot shaft 1018, and first adapter 1002a of FIG. 10 detached from each other. The pivot shaft 1018 (which includes a flared flat top) is interchangeable with the pivot shaft 118 of FIG. 1B. The connector 1004 includes a connector hole 1102 through a top side and a bottom side of the connector. A first end 1104 of the connector is insertable between the top plate 1010 and bottom plate 1012 and is configured to rotate about the pivot shaft 1018 when the pivot shaft is inserted through the connector holes 1114 of the adapter 1002 and the connector holes 1102 of the connector 1004.

Figure 12:
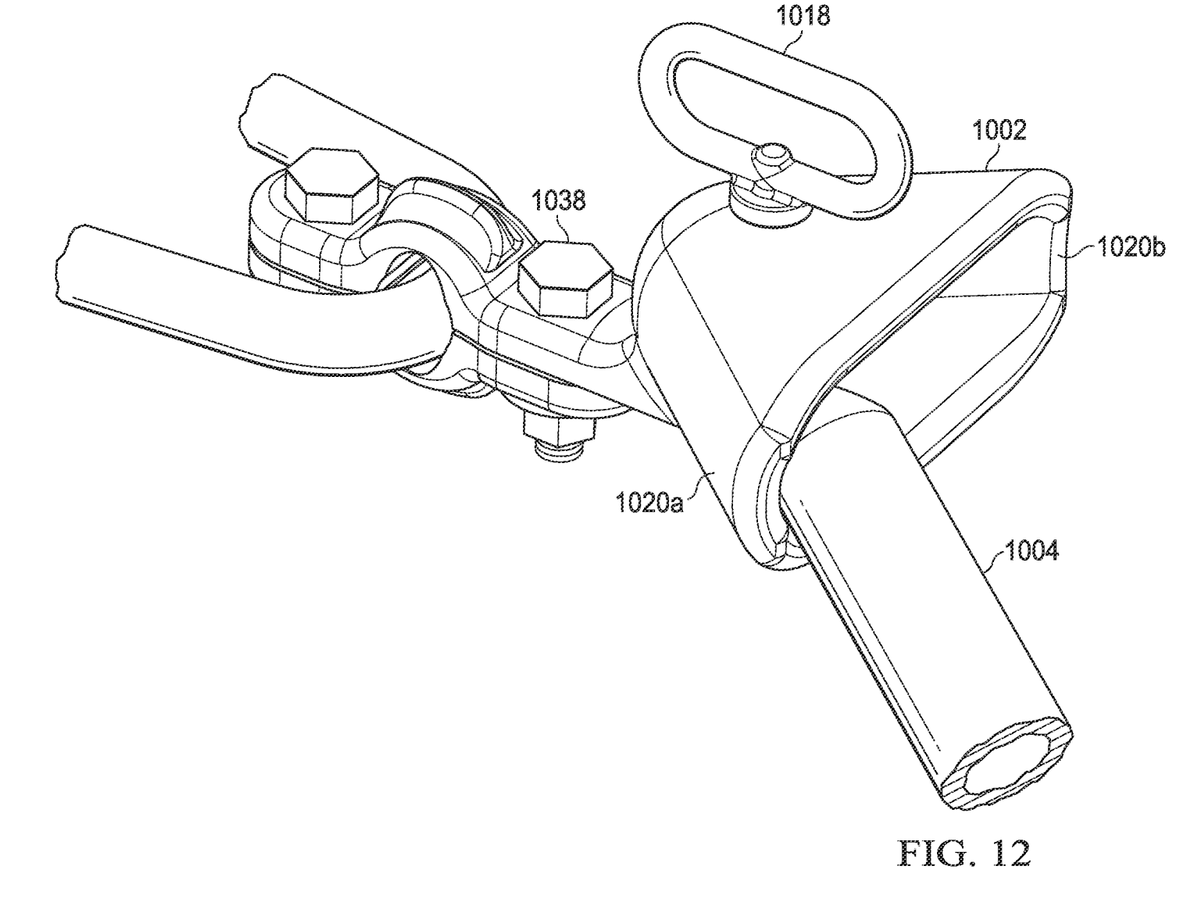
FIG. 12 is a close-up view of an adapter of the linage system of FIG. 10 in a state in which the connector is pivoted to a maximum, according to this disclosure.

FIG. 12 illustrates a close-up view of an adapter 1002 of the linkage system of FIG. 10 in a state in which the connector 1004 is pivoted to a first maximum in surface-to-surface contact with one sidewall barrier 1020a, according to this disclosure. The connector 1004 pivots the maximum pivot angle θ when the connector 1004 pivots from the position of first maximum to a position of the second maximum. The position of the second maximum is where the connector 1004 is in surface-to-surface contact with the opposite sidewall barrier 1020b.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relation to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
an adapter that includes:
a clamp configured to attach to a frame of a wheelchair; and
a pivot angle limiter configured to attach to the clamp, the pivot angle limiter including:
a top plate and a bottom plate, each having a central hole through which a pivot shaft is insertable to define a pivot axis for a connector to rotate about; and
first and second barriers, each extending between the top plate and the bottom plate, wherein the first and second barriers define a maximum pivot angle that has a vertex at the pivot axis, wherein at least one of the first and second barriers includes a spacer that extends a distance from the top plate to the bottom plate and that is composed from a rigid material to maintain the distance between the top plate and the bottom plate, and wherein the spacer includes a spacer hole extending longitudinally through the spacer and configured to receive a mechanical fastener.

2. The apparatus of claim 1, further comprising the connector that includes:
a connector hole through a top side and a bottom side of the connector; and
a first end of the connector that is insertable between the top plate and bottom plate and is configured to rotate about the pivot shaft when the pivot shaft is inserted through the connector holes; and
a second end of the connector, opposite to the first end of the connector, for connecting to a second adapter for a second wheelchair.

3. The apparatus of claim 2, wherein:
the first end of the connector is configured to connect to the adapter at one vertical level; and
the second end of the connector is configured to connect to the second adapter at a different vertical level.

4. The apparatus of claim 1, further comprising:
the pivot shaft configured to insert through the central hole of the top plate, the central hole of the bottom plate, and a connector hole through a top side and a bottom side of the connector.

5. The apparatus of claim 2, wherein within each of the adapter and the second adapter:
a cross-section of the frame of the wheelchair corresponds to a cross-section of an open space within the clamp; and
the frame of the wheelchair occupies the open space when the clamp is attached.

6. The apparatus of claim 1, wherein:
the spacer is removably coupled to the top plate and the bottom plate; and
each of the top plate and the bottom plate includes a corresponding spacer hole into which the mechanical fastener insertably fits to maintain the spacer centered about the corresponding spacer holes of the top and bottom plates.

7. The apparatus of claim 6, wherein the corresponding spacer holes include:
a first spacer hole positioned one distance from the pivot shaft and defining the maximum pivot angle as a first angle; and
a second spacer hole positioned another distance from the pivot shaft and defining the maximum pivot angle as a second angle different from the first angle.

8. The apparatus of claim 1, wherein:
the spacer is removably coupled to the top plate and the bottom plate;
each of the top plate and the bottom plate includes a spacer slot into which the mechanical fastener is insertable and slidable between a first end of the spacer slot and a second end of the spacer slot; and
the maximum pivot angle is adjustable based on a location where the mechanical fastener affixes the spacer to the top and bottom plates, the location being between the first and second ends of the spacer slot.

9. An apparatus comprising:
an adapter that includes:
a clamp configured to attach to a frame of a wheelchair, wherein the clamp includes:
a U-bolt; and
a spacer configured to clamp the U-bolt to one of:
an oval cross-sectioned member of the frame of the wheelchair, or
a circular cross-sectioned member of the frame of the wheelchair; and
a pivot angle limiter configured to attach to the clamp, the pivot angle limiter including:
a top plate and a bottom plate, each having a central hole through which a pivot shaft is insertable to define a pivot axis for a connector to rotate about; and
first and second barriers, each extending between the top plate and the bottom plate, wherein the first and second barriers define a maximum pivot angle that has a vertex at the pivot axis.

10. The apparatus of claim 9, wherein at least one of the first and second barriers forms a side wall integrated with the top plate and the bottom plate.

11. A linkage system comprising:
at least one adapter, each adapter including:
a clamp configured to attach to a frame of a wheelchair;
a pivot angle limiter configured to attach to the clamp, the pivot angle limiter including:
a top plate and a bottom plate, each having a central hole through which a pivot shaft is insertable to define a pivot axis for a connector to rotate about; and
first and second barriers, each extending between the top plate and the bottom plate, wherein the first and second barriers define a maximum pivot angle that has a vertex at the pivot axis; and
the connector,
wherein the at least one adapter comprises:
a first adapter that connects to a one end of the connector, wherein the clamp of the first adapter is configured to clamp to the frame of a first wheelchair; and
a second adapter that connects to an opposite end of the connector, wherein the clamp of the second adapter is configured to clamp to the frame of a second wheelchair.

12. The linkage system of claim 11, wherein the connector includes:
a connector hole through a top side and a bottom side of the connector; and
a first end of the connector that is insertable between the top plate and bottom plate and is configured to rotate about the pivot shaft when the pivot shaft is inserted through the connector holes; and a second end of the connector, opposite to the first end of the connector, for connecting to the second adapter for the second wheelchair.

13. The linkage system of claim 12, wherein:
the first end of the connector is configured to connect to the first adapter at one vertical level; and
the second end of the connector is configured to connect to the second adapter at a different vertical level.

14. The linkage system of claim 11, wherein each adapter further comprises:
the pivot shaft configured to insert through the central hole of the top plate, the central hole of the bottom plate, and a connector hole through a top side and a bottom side of the connector.

15. The linkage system of claim 11, wherein within each adapter:
at least one of the first and second barriers includes a spacer that extends a distance from the top plate to the bottom plate and that is composed from a rigid material to maintain the distance between the top plate and the bottom plate.

16. The linkage system of claim 15, wherein within each adapter:
the spacer is removably coupled to the top plate and the bottom plate and includes a spacer hole extending longitudinally through the spacer and configured to receive a mechanical fastener; and
each of the top plate and the bottom plate includes a corresponding spacer hole into which the mechanical fastener insertably fits to maintain the spacer centered about the corresponding spacer holes of the top and bottom plates.

17. The linkage system of claim 16, wherein the corresponding spacer holes include:
a first spacer hole positioned one distance from the pivot shaft and defining the maximum pivot angle as a first angle; and
a second spacer hole positioned another distance from the pivot shaft and defining the maximum pivot angle as a second angle different from the first angle.

18. The linkage system of claim 15, wherein within each adapter:
the spacer is removably coupled to the top plate and the bottom plate and includes a spacer hole extending longitudinally through the spacer and configured to receive a mechanical fastener;
each of the top plate and the bottom plate includes a spacer slot into which the mechanical fastener is insertable and slidable between a first end of the spacer slot and a second end of the spacer slot; and
the maximum pivot angle is adjustable based on a location where the mechanical fastener affixes the spacer to the first and second barriers, the location being between the first and second ends of the spacer slot.

19. The linkage system of claim 11, wherein within each adapter:
at least one of the first and second barriers forms a side wall integrated with the top plate and the bottom plate.

20. The linkage system of claim 11, wherein within the first adapter and the second adapter among the at least one adapter:
a cross-section of the frame of the wheelchair corresponds to a cross-section of an open space within the clamp; and
the frame of the wheelchair occupies the open space when the clamp is attached.

* * * * *

UNITED STATES PATENT AND TRADEMARK OFFICE
CERTIFICATE OF CORRECTION

| | | |
|---|---|---|
| PATENT NO. | : 12,127,985 B2 | Page 1 of 1 |
| APPLICATION NO. | : 17/390716 | |
| DATED | : October 29, 2024 | |
| INVENTOR(S) | : Abbondanzio et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 623 days.

Signed and Sealed this
Twelfth Day of August, 2025

Coke Morgan Stewart
*Acting Director of the United States Patent and Trademark Office*